United States Patent [19]

Heismann

[11] 4,435,949
[45] Mar. 13, 1984

[54] MULCHING ADAPTER FOR ROTARY LAWN MOWER

[75] Inventor: Richard A. Heismann, Knoxville, Ill.

[73] Assignee: Outboard Marine Corporation, Waukegan, Ill.

[21] Appl. No.: 397,102

[22] Filed: Jul. 12, 1982

[51] Int. Cl.³ .............................................. A01D 53/08
[52] U.S. Cl. ..................... 56/320.2; 56/255; 56/17.5
[58] Field of Search ................. 56/255, 320.2, 320.1, 56/17.5, 13.3, 295

[56] References Cited

U.S. PATENT DOCUMENTS

| 2,659,191 | 11/1953 | Miller et al. | 56/255 |
| 2,857,727 | 10/1958 | Cole | 56/255 |
| 2,983,096 | 5/1961 | Phelps | 56/255 |
| 3,118,267 | 1/1964 | Shaw | 56/255 |
| 3,680,295 | 8/1972 | Rutherford | 56/255 |
| 3,696,595 | 10/1972 | Dahl | 56/320.2 |
| 3,706,190 | 12/1972 | Taub | 56/320.2 |
| 4,135,351 | 1/1979 | Akgulian | 56/255 |
| 4,189,904 | 2/1980 | Paker | 56/255 |
| 4,312,174 | 1/1982 | Vanderhoef | 56/255 |

Primary Examiner—Gene Mancene
Assistant Examiner—John G. Weiss
Attorney, Agent, or Firm—Michael, Best & Friedrich

[57] ABSTRACT

A mulching adapter for use in a rotary lawn mower having a blade housing including a grass discharge chute through which cut grass is adapted to be discharged. A grass mulching assembly is insertable through the discharge outlet into the discharge chute for blocking the discharge chute. The grass mulching assembly includes an inner portion defining a surface facing the rotary cutting blade and forming a generally continuous surface with the blade housing interior surface.

14 Claims, 3 Drawing Figures

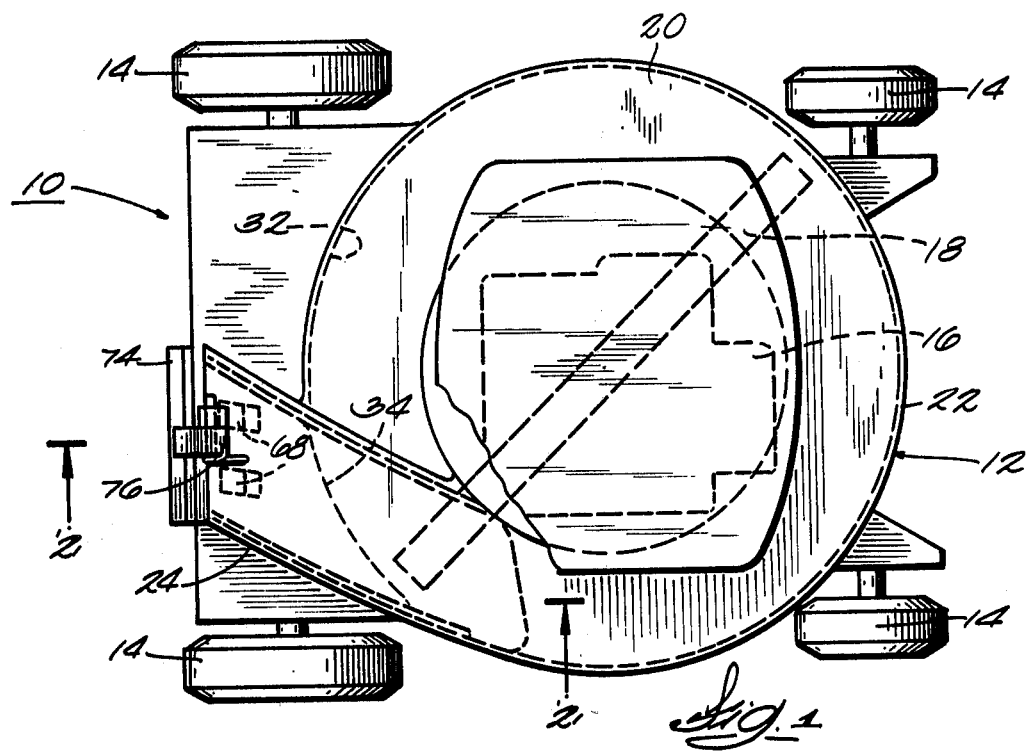
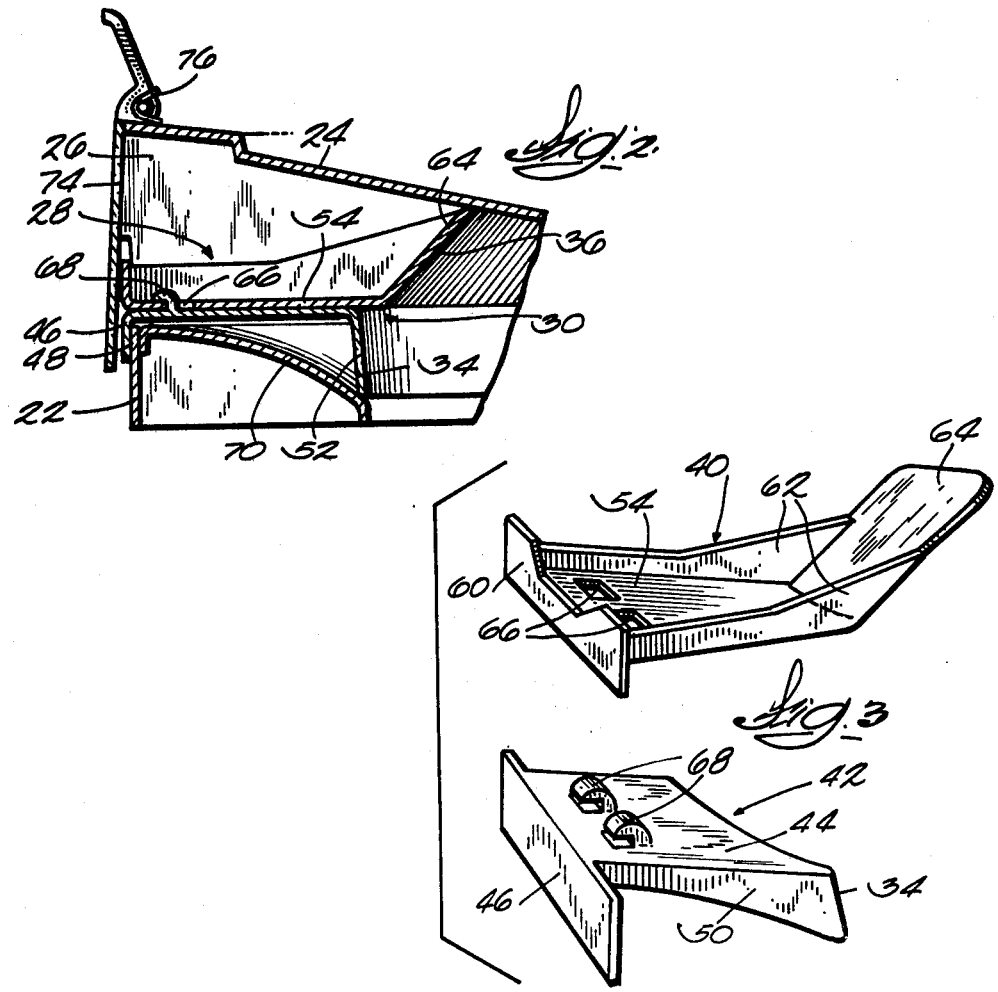

MULCHING ADAPTER FOR ROTARY LAWN MOWER

FIELD OF THE INVENTION

The invention relates to rotary lawn mowers and more particularly to an adapter which can be inserted into the discharge chute of a rotary lawn mower for converting the lawn mower to a mulching type mower.

BACKGROUND PRIOR ART

Examples of prior art lawn mowers including apparatus for converting a discharge type mower to a mulching mower are illustrated in the Akgulian U.S. Pat. No. 4,135,351, issued Jan. 23, 1979.

Attention is further directed to the Thorud et al. U.S. Pat. No. 3,750,378, issued Aug. 7, 1973; Miller et al. U.S. Pat. No. 2,659,191, issued Nov. 17, 1953; the Cole U.S. Pat. No. 2,857,727, issued Oct. 28, 1958; the Phelps U.S. Pat. No. 2,983,096, issued May 9, 1961; the DeLay U.S. Pat. No. 3,531,923, issued Oct. 6, 1970; and the Dahl U.S. Pat. No. 3,646,739, issued Mar. 7, 1972.

Attention is also directed to the Rutherford U.S. Pat. No. 3,680,295, issued Aug. 1, 1972; the Jackson et al. U.S. Pat. No. 4,189,903, issued Feb. 26, 1980; the Paker U.S. Pat. No. 4,189,904, issued Feb. 26, 1980; and the Vanderhoef U.S. Pat. No. 4,312,174, issued Jan. 26, 1982.

SUMMARY OF THE INVENTION

The invention provides a rotary lawn mower having a blade housing with a generally circular interior surface and including a grass discharge chute with a discharge outlet through which cut grass is discharged. At least one wheel supports the blade housing for movement along the ground, a cutting blade is supported in the housing, and a prime mover is supported by the housing and connected to the blade for causing rotation of the blade about a generally vertical axis. A grass mulching assembly is insertable through the discharge outlet into the discharge chute for blocking the discharge chute to prevent cut grass from passing through the discharge chute. The mulching assembly includes an inner portion defining a surface facing the rotary cutting blade and forming a generally continuous surface with the blade housing interior surface.

The invention also provides a grass mulching adapter assembly for use with a rotary lawn mower including a blade housing having a generally circular interior surface and having a grass discharge chute including a discharge outlet through which cut grass is adapted to be discharged, at least one wheel for supporting the blade housing for movement along the ground, a cutting blade supported in the blade housing, and a prime mover supported by the blade housing and connected to the blade and for causing rotation of the blade about a generally vertical axis. The grass mulching adapter assembly is insertable through the discharge outlet into the discharge chute for blocking the discharge chute to prevent cut grass from passing through the discharge chute. The mulching adapter assembly includes an inner portion defining a surface facing the rotary cutting blade and forming a generally continuous surface with the blade housing interior surface.

In a preferred embodiment of the invention the inner portion surface includes an upper surface portion sloping upwardly and inwardly with respect to the axis of rotation of the blade and a lower surface portion defining a substantially vertical surface and being curved about the axis of rotation of the blade. The vertical surface is adjacent the path of the cutting blade when the cutting blade is caused to rotate. The upper surface portion is above the path of the cutting blade.

In a preferred embodiment of the invention the upper surface portion is positioned so as to deflect those grass particles striking the upper surface portion downwardly and toward the cutting blade.

In a preferred embodiment of the invention the grass mulching assembly includes a lower portion and an upper portion adapted to be positioned in vertically stacked relation, and means for releaseably joining the upper and lower portions together in stacked relation when the grass mulching assembly is housed in the discharge chute.

In a preferred form of the invention the lower portion of the mulching adapter assembly includes a horizontal plate portion, a downwardly extending flange joined to an outer portion of the horizontal plate portion, the downwardly extending flange being adapted to engage the outer surface of the blade housing, and an inner wall portion extending downwardly from an inner portion of the horizontal plate portion, the inner wall portion including a surface facing the rotary cutting blade and defining a substantially vertical surface and being curved about the axis of rotation of the blade.

Various features of the invention are set forth in the following description of a preferred embodiment, in the claims, and in the drawings.

BRIEF DESCRIPTION OF THE DRAWINGS

FIG. 1 is a plan view of a rotary lawn mower embodying the invention.

FIG. 2 is a cross-section view taken along line 2—2 in FIG. 1.

FIG. 3 is an exploded perspective view of the mulching adapter illustrated in FIGS. 1 and 2.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF A PREFERRED EMBODIMENT

Illustrated in FIG. 1 is a lawn mower 10 embodying the invention and generally including a blade housing 12 supported by a plurality of wheels 14 for movement along the ground. The blade housing 12 supports a prime mover or engine 16, the engine 16 being operable to drive a rotary cutting blade 18 for rotation about a generally vertical axis.

A blade housing 12 includes a flat upper deck 20 and sidewalls 22 which extend downwardly from the upper deck 20 toward the ground and so as to surround the rotary cutting blade 18 and to form a generally circular chamber around the rotary cutting blade 18. In the illustrated construction the blade housing 12 also includes a discharge chute portion 24 extending rearwardly from the periphery of the blade housing 12. The rearward end of this discharge chute 24 defines a discharge opening 26. In one form of operation of the lawn mower 10, a grass receiving bag (not shown) may be joined to the rear of the discharge chute 24, and the blade housing 12 and the rotary cutting blade 18 are shaped such that grass cut by the blade 18 will be pulled up into the blade housing chamber and will be discharged from the blade housing chamber rearwardly through the discharge chute 24 and into the bag supported rearwardly of the blade housing.

Means are also provided for blocking the discharge outlet 26 to prevent grass from being discharged through the discharge chute 24 and providing for conversion of the rotary lawn mower 10 to a mulching type lawn mower wherein the grass being cut by the rotary blade 18 is suspended in the swirling air in the housing chamber and is cut by the blade 18 into fine particles so as to form mulch. The means for blocking the discharge chute 24 includes a grass mulching assembly 28 removeably insertable through the discharge opening 26 and into the discharge chute 24.

The grass mulching assembly 28 includes an inner portion having a surface 30 facing the rotary cutting blade 18 and adapted to form a generally continuous surface with the generally circular interior surface 32 of the blade housing 12 and such that the inner surface of the blade housing 12 is continuous and uniform around the entire periphery of the path of the cutting blade. Referring more particularly to the inner portion surface 30 of the grass mulching assembly 28, it includes a lower portion 34 defining a generally vertical surface, that vertical surface 34 being curved about the axis of rotation of the cutting blade 18 and being particularly shaped so as to be continuous with the curved interior surface 32 of the downwardly extending wall portion 22 of the blade housing 12. The inner portion surface 30 of the grass mulching assembly 28 also includes an upper portion 36 which slopes upwardly and toward the axis of rotation of the cutting blade 18, the upper portion 36 being above the path of the tips of the cutting blade 18. The upper portion 36 of the surface 30 is oriented so as to be continuous with the upper portions of the periphery of the blade housing and such that the grass clippings striking the upper surface portion 36 will be deflected downwardly into the path of the cutting blade 18 whereby the cutting blade can cut the blades of grass into fine particles or mulch.

While the grass mulching assembly 28 which is insertable into the discharge chute 24 could have various constructions, in a preferred form of the invention, it is comprised of an upper portion 40 and a lower portion 42 joined together in vertically stacked relation. The lower portion 42 includes a generally horizontal plate portion 44 having a length slightly less than the distance between the discharge opening 26 and the path of the tip of the cutting blade 18, and a width approximately equal to the width of the discharge chute 24. In the illustrated construction the lower portion 42 further includes means for limiting the movement of the lower portion 42 into the discharge chute 24 and thereby insuring that the inner end of the lower portion 42, i.e. the end of the lower portion 42 adjacent the cutting blade, does not contact the rotary cutting blade 18. In the illustrated construction this means for limiting the movement of the lower portion includes a flange 46 fixedly secured to the outer end of the horizontal plate 44 and adapted to engage an outer surface portion 48 of the blade housing 12 as shown in FIG. 2.

The lower portion 42 also includes a pair of sidewalls 50 extending downwardly from the lateral edges of the horizontal plate 44 and extending along the length of the horizontal plate 44. Also included is a generally vertical wall 52 integrally joined to the horizontal plate 44 and to the sidewalls 50. The generally vertical wall 52 is curved about the axis of rotation of the cutting blade and includes the vertical curved surface 34 facing the axis of rotation of the cutting blade 18. As previously stated, the vertical wall 52 is shaped so as to be adapted to cooperate with or complement the generally circular interior surface of the blade housing 12 so that the blade housing has a generally uniform and continuous circular inner surface.

The upper portion or upper half 40 of the mulching adapter 28 includes a generally horizontal plate portion 54 adapted to rest on the upper surface of the horizontal plate portion 44 of the lower half 42. The upper half horizontal plate portion 54 has a width generally the same as that of the discharge chute 24. The outer end of the upper portion 40 of the mulching adapter 28 includes means for engaging the outer surface of the blade housing 12 and to thereby provide a means for limiting the movement of the upper portion 40 into the discharge chute 24 and for properly positioning the inner surface portion 36 of the mulching adapter upper portion. In the illustrated construction, this means for limiting insertion of the upper portion 40 includes a flange 60, the flange 60 including opposite ends extending outwardly beyond the lateral edges of the discharge chute opening 26 so as to be engageable with the outer surface of the blade housing 12. The upper mulcher adapter portion 40 also includes a pair of sidewalls 62 extending along the lateral sides of the horizontal plate 54, and extending upwardly from these lateral sides. The mulcher adapter upper portion 40 also includes an inner wall or plate portion 64 which is inclined upwardly and inwardly with respect to the inner end of the horizontal plate 54, the inner wall 64 including an inclined surface facing the cutting blade, this surface comprising the upper surface portion 36 of the surface 30. The lower edge of the inclined wall 64 is integrally joined to the horizontal plate 54 portion and the lateral edges of the inclined wall are integrally joined to the sidewalls 62. The inclined wall 64 is positioned at an angle adapted to cause the grass cuttings striking the surface 36 of the inclined wall 64 to be deflected downwardly again into the path of the cutting blade 18 where these grass cuttings can be further cut by the cutting blade 18 into fine particles or mulch.

Means are also provided for releaseably joining together the upper and lower mulching adapter portions 40 and 42. In the illustrated arrangement, the horizontal plate portion 54 of the upper mulching adapter portion 40 is provided with a pair of spaced apart apertures 66, and a pair of locking tabs or hooks 68 project upwardly from the upper surface of the horizontal plate portion 44 of the lower mulching adapter portion 42. The locking tabs 68 are adapted to extend upwardly through the apertures 66 and to engage the upper portion 40 as shown in FIG. 2 to thereby prevent separation of the upper and lower portions 40 and 42 once they have been inserted into the discharge chute.

In operation of the mulching adapter 28, the lower portion 42 of the mulching adapter 28 is inserted into the discharge passage 24 such that the flange 46 engages the outer surface of the blade housing 12 and the lower edge of the vertical wall 52 rests on the bottom wall 70 of the mower discharge chute. The upper portion 40 is then slideably inserted into the discharge chute 24 over the horizontal plate portion 44 until the apertures 66 are positioned over the upwardly extending locking tabs 68 and wherein the locking tabs 68 will then project through the apertures 66. In a preferred form of the invention the upper surfaces of the locking tabs 68 have a smooth rounded contour in order to provide for convenient sliding movement of the upper adapter portion 40 over the lower adapter 42 when the upper adapter portion 40 is inserted into the discharge passage 24.

In the embodiment of the invention illustrated in FIG. 1, the lawn mower 10 illustrated there also includes a spring loaded door 74 adapted to close the discharge opening 26 when the lawn mower bag has been removed. The door 74 is pivotable about a generally horizontal axis located immediately above the discharge opening 26, and a coil spring 76 functions to bias the door toward a closed position. When the mulching adapter 28 is inserted into the discharge chute 24, the door will engage the flanges 46 and 60 of the mulching adapter 28 thereby restraining the mulching adapter against removal.

One of the particular advantages of the invention is that the mulcher adapter 28 can be installed by inserting it through the discharge opening 26 of the discharge chute 24. Whereas prior art mulching adapters have required the removal of the mower cutting blade and the insertion of apparatus into the blade housing and have required the use of tools and substantial labor in connection with modification of the rotary lawn mower so as to house the mulching adapter, with the apparatus embodying the invention, the upper and lower halves 40 and 42 of the mulching adapter can be conveniently slideably inserted into the discharge chute 24 through the discharge opening 26 wherein they lock together firmly and wherein they are held in place by the spring loaded door 74. Additionally, whereas the prior art apparatus may include components which can vibrate loose and come in contact with the rotary cutting blade 18, thereby causing damage to the cutting unit and possible injury to the operator, the mulching adapter 28 described above does not include components which can become disassembled or come in contact with the cutting blade 18.

Various features of the invention are set forth in the following claims.

I claim:

1. A lawn mower comprising a blade housing having a generally circular interior surface and having a grass discharge chute includng a discharge outlet through which cut grass is adapted to be discharged, at least one wheel for supporting said blade housing for movement along the ground, a cutting blade supported in said blade housing, a prime mover supported by said blade housing and connected to said blade for causing rotation of said blade about a generally vertical axis, and a grass mulcher insertable through said discharge outlet into said discharge chute for blocking said discharge chute to prevent cut grass from passing through said discharge chute, said mulcher comprising an inner portion including a substantially vertical surface curved about said generally vertical axis, spaced from but adjacent the path of said cutting blade, and forming a generally continuous surface with said blade housing interior surface, said inner portion of said mulcher also including an upper surface sloping upwardly and inwardly with respect to said generally vertical axis so as to deflect downwardly and toward said cutting blade moving pieces of grass, cut by said cutting blade and striking said upper surface.

2. A lawn mower as set forth in claim 1 wherein said mulcher includes an outer portion including means for engaging said discharge outlet so as to limit movement of said mulcher into said discharge chute.

3. A lawn mower comprising a blade housing having a generally circular interior surface and having a grass discharge chute including a discharge outlet through which cut grass is adapted to be discharged, at least one wheel for supporting said blade housing for movement along the ground, a cutting blade supported in said blade housing, a prime mower supported by said blade housing and connected to said blade for causing rotation of said blade about a generally vertical axis, and a grass mulching assembly insertable through said discharge outlet into said discharge chute for blocking said discharge chute to prevent cut grass from passing through said discharge chute, said mulching assembly including an inner portion facing said rotary cutting blade and forming a generally continuous surface with said blade housing interior surface, said grass mulching assembly including a lower portion and an upper portion adapted to be positioned in vertically stacked relation, and means for releaseably joining together said lower portion and said upper portion in stacked relation when said grass mulching assembly is housed in said discharge chute.

4. A lawn mower as set forth in claim 3 wherein said blade housing includes an outer surface and wherein said lower portion includes a horizontal plate portion having an outer portion and an inner portion, a downwardly extending flange joined to said outer portion of said horizontal plate portion, said downwardly extending flange being adapted to engage said outer surface of said blade housing, and an inner wall fixed to said inner portion, said inner wall including a surface facing said rotary cutting blade, said inner wall surface forming a portion of said surface facing said rotary cutting blade and said inner wall surface defining a substantially vertical surface curved about said axis of rotation of said blade.

5. A lawn mower as set forth in claim 4 wherein said upper portion includes a horizontal plate portion having one end adjacent said cutting blade and an outer end adjacent said housing outer surface, a flange joined to said outer end and adapted to engage said housing outer surface, and an inclined wall having a lower portion integrally joined to said one end adjacent said cutting blade, said inclined wall including a surface facing said cutting blade and sloping upwardly and inwardly from said horizontal portion toward said axis of rotation of said cutting blade.

6. A lawn mower as set forth in claim 5 wherein said horizontal plate portion of said lower portion and said horizontal plate portion of said upper portion are adapted to be positioned in stacked relation when said mulching adapter assembly is housed in said discharge opening, and wherein said means for releaseably joining said upper portion and said lower portion includes at least one aperture in one of said horizontal plate portions and a hook member projecting from the other of said horizontal plate portions and adapted to extend through said one aperture and to engage said one of said horizontal plate portions.

7. A lawn mower as set forth in claim 3 wherein said blade housing includes an outer surface and wherein said upper portion includes a horizontal plate portion having one end adjacent said rotary blade and an outer end adjacent said housing outer wall, a flange extending upwardly from said outer end and adapted to engage said outer surface of said blade housing, and an inclined wall having a lower portion integrally joined to said horizontal plate portion one end, said inclined wall including a surface facing said cutting blade and sloping upwardly and inwardly from said horizontal portion toward said axis of rotation of said blade.

8. A grass mulcher for use in a rotary lawn mower having a blade housing including a generally circular interior surface and having a grass discharge chute including a discharge outlet through which cut grass is adapted to be discharged, at least one wheel for supporting the blade housing for movement along the ground, a cutting blade supported in the blade housing, and a prime mover supported by the blade housing and connected to the blade for causing rotation of the blade about a generally vertical axis, the grass mulcher being insertable through the discharge outlet into the discharge chute for blocking the discharge chute to prevent cut grass from passing through the discharge chute, said mulcher including an inner portion including a substantially vertical surface curved about the generally vertical axis, spaced from but adjacent the path of the cutting blade, and forming a generally continuous surface with the blade housing interior surface, said inner portion of said mulcher also including an upper surface sloping upwardly and inwardly with respect to the generally vertical axis so as to deflect downwardly and toward the cutting blade moving pieces of grass, cut by the cutting blade and striking said upper surface.

9. A grass mulching assembly as set forth in claim 8 and including an outer portion having means for engaging said discharge outlet so as to limit movement of said mulcher assembly into said discharge chute.

10. A grass mulching assembly for use in a rotary lawn mower having a blade housing including a generally circular interior surface and having a grass discharge chute including a discharge outlet through which cut grass is adapted to be discharged, at least one wheel for supporting the blade housing for movement along the ground, a cutting blade supported in the blade housing, and a prime mover supported by the blade housing and connected to the blade for causing rotation of the blade about a generally vertical axis, said grass mulching assembly being insertable through the discharge outlet into the discharge chute for blocking the discharge chute to prevent cut grass from passing through the discharge chute, and said mulching assembly including an inner portion facing the rotary cutting blade and forming a generally continuous surface with the blade housing interior surface, said mulching assembly further including a lower portion and an upper portion adapted to be positioned in vertically stacked relation, and means for releaseably joining said lower portion and said upper portion together in stacked relation when said grass mulching assembly is housed in said discharge chute.

11. A grass mulching assembly as set forth in claim 10 wherein said blade housing includes an outer surface and wherein said lower portion includes a horizontal plate portion having an outer portion and an inner portion, a downwardly extending flange joined to said outer portion of said horizontal plate portion, said downwardly extending flange being adapted to engage said outer surface of said blade housing, and an inner wall fixed to said inner portion, said inner wall including a surface facing said rotary cutting blade, said inner wall surface forming a portion of said surface facing said rotary cutting blade and said inner wall surface defining a substantially vertical surface curved about said axis of rotation of said blade.

12. A grass mulching assembly as set forth in claim 11 wherein said upper portion includes a horizontal plate portion having one end adjacent said cutting blade and an outer end adjacent said housing outer surface, a flange joined to said outer end and adapted to engage said housing outer surface, and an inclined wall having a lower portion integrally joined to said one end adjacent said cutting blade, said inclined wall including a surface facing said cutting blade and sloping upwardly and inwardly from said horizontal portion toward said axis of rotation of said cutting blade.

13. A grass mulching assembly as set forth in claim 12 wherein said horizontal plate portion of said lower portion and said horizontal plate portion of said upper portion are adapted to be positioned in stacked relation when said mulching adapter assembly is housed in said discharge opening, and wherein said means for releaseably joining said upper portion and said lower portion includes at least one aperture in one of said horizontal plate portions and a hook member projecting from the other of said horizontal plate portions and adapted to extend through said one aperture and to engage said one of said horizontal plate portions.

14. A grass mulching assembly as set forth in claim 10 wherein said blade housing includes an outer surface and wherein said upper portion includes a horizontal plate portion having one end adjacent said rotary blade and an outer end adjacent said housing outer wall, a flange fixed to said outer end and adapted to engage said outer surface of said blade housing, and an inclined wall having a lower portion integrally joined to said horizontal plate portion one end, said inclined wall including a surface facing said cutting blade and sloping upwardly and inwardly from said horizontal portion toward said axis of rotation of said blade.

* * * * *